United States Patent
Chakraborty et al.

(10) Patent No.: US 11,184,149 B2
(45) Date of Patent: Nov. 23, 2021

(54) COMPUTING RANGE QUERIES OVER ENCRYPTED DATA

(71) Applicant: International Business Machines Corporation, Armonk, NY (US)

(72) Inventors: Supriyo Chakraborty, White Plains, NY (US); Akshar Kaul, Bangalore (IN); Hugo Krawczyk, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 463 days.

(21) Appl. No.: 16/279,419

(22) Filed: Feb. 19, 2019

(65) Prior Publication Data

US 2020/0266972 A1 Aug. 20, 2020

(51) Int. Cl.
| | |
|---|---|
| *H04K 1/00* | (2006.01) |
| *H04L 9/00* | (2006.01) |
| *H04L 9/28* | (2006.01) |
| *H04L 9/06* | (2006.01) |
| *G06F 16/903* | (2019.01) |
| *G06F 16/901* | (2019.01) |

(52) U.S. Cl.
CPC ........ *H04L 9/0618* (2013.01); *G06F 16/9027* (2019.01); *G06F 16/90335* (2019.01)

(58) Field of Classification Search
CPC ............. H04L 9/0618; G06F 16/90335; G06F 16/9027
USPC .......................................................... 380/28
See application file for complete search history.

(56) References Cited

U.S. PATENT DOCUMENTS

| | | | | |
|---|---|---|---|---|
| RE40,334 E | * | 5/2008 | Maillard | H04N 7/1675 726/26 |
| 10,360,390 B2 | * | 7/2019 | Tueno | G06F 21/602 |
| 2005/0147240 A1 | * | 7/2005 | Agrawal | G06F 21/60 380/28 |
| 2007/0033419 A1 | * | 2/2007 | Kocher | G06F 9/445 713/193 |
| 2011/0167129 A1 | * | 7/2011 | Matzkel | H04L 67/42 709/217 |
| 2012/0167164 A1 | * | 6/2012 | Burgess | G06F 21/00 726/1 |
| 2014/0281512 A1 | * | 9/2014 | Arasu | H04L 63/062 713/165 |

(Continued)

OTHER PUBLICATIONS

Isamu Teranishi; Order-Preserving Encryption Secure Beyond One-Wayness; Springer:2014; p. 42-61.*

(Continued)

*Primary Examiner* — Monjur Rahim
(74) *Attorney, Agent, or Firm* — Jeffrey S LaBaw, Esq.; McGinn I. P. Law Group, PLLC.

(57) ABSTRACT

A method (and structure and computer product) to encrypt plaintext data into ciphertext data includes encrypting, using a processor on a computer, plaintext into corresponding ciphertext, using a Property Preserving Encryption (PPE) protocol in which a predefined property is maintained when plaintext values are encrypted into ciphertext values. The predefined property is randomly flipped during encryption to reverse the predefined property in the corresponding ciphertext node. An indication of whether the predefined property has been maintained or reversed is stored as the state of encryption.

20 Claims, 8 Drawing Sheets

(56) References Cited

U.S. PATENT DOCUMENTS

| | | | |
|---|---|---|---|
| 2015/0295716 A1* | 10/2015 | Liu | H04L 9/0618 |
| | | | 713/191 |
| 2016/0344557 A1* | 11/2016 | Chabanne | H04L 9/3066 |
| 2017/0214520 A1* | 7/2017 | Teper | H04L 9/003 |
| 2019/0268146 A1* | 8/2019 | Samid | H04L 9/3226 |
| 2019/0297061 A1* | 9/2019 | Von Vistauxx | H04L 63/0457 |
| 2020/0076614 A1* | 3/2020 | Georgieva | H04L 9/3249 |

OTHER PUBLICATIONS

Mel, et al. "The NIST Definition of Cloud Computing". Recommendations of the National Institute of Standards and Technology. Nov. 16, 2015.

* cited by examiner

OPE: Enc(m1) < Enc(m2) ⟹ m1 < m2

| SCORE | OPE_Enc(Score) |
|---|---|
| 68 | 0x0001102789d5f50b2beffd9f3dca4ea7 |
| 71 | 0x0065fda789ef4e272bcf102787a93903 |
| 90 | 0x009b5708e13665a7de14d3d824ca9f15 |
| 98 | 0x04e062ff507458f9be50497656ed654c |

Tree 1

Tree 2

Tree 3

Tree 4

Tree 5

Tree 6

Tree 7

COMPUTING RANGE QUERIES OVER ENCRYPTED DATA

BACKGROUND

The present invention relates generally to encryption and more specifically to an encryption scheme which allows range queries to be performed on the encrypted data without first decrypting the data, by modifying a Property Preserving Encryption (PPE) scheme to randomly contradict the expected property in the ciphertext. By randomly flipping the order of cipher text compared to their plaintext in an Order Preserving Encryption (OPE) scheme and maintaining the record of the flipping events, this new encryption scheme, Flipped OPE (FOPE), supports range queries over the encrypted data even when the cipher text does not follow the order of corresponding plain texts.

SUMMARY

In accordance with an exemplary embodiment, the present invention discloses a method (and apparatus and computer product) for encrypting plaintext data into ciphertext data, including encrypting plaintext data into ciphertext data by executing a Property Preserving Encryption (PPE) scheme on a processor on a computer as an encryption process, the PPE scheme preserving a predefined property between plaintext values and their associated ciphertext values, wherein the encryption process randomly flips the predefined property and generates a state of encryption that comprises a record of whether the predefined property is maintained or flipped during an encryption; storing the ciphertext data; and storing the state of encryption as a record of when the predefined property has been randomly broken.

In accordance with an exemplary embodiment, also disclosed herein is a method (and apparatus and computer product) for computing range queries over encrypted data, including initially encrypting plaintext data by executing an Order Preserving Encryption (OPE) protocol as an encryption on a processor on a computer and storing ciphertext data in a database via a remote, unsecured server, the OPE protocol maintaining an order of values when plaintext values are encrypted into ciphertext values, wherein during the encrypting, for each node of plaintext being encrypted, the order is randomly flipped, and, for each encrypted plaintext node, a state of encryption is generated and stored so as to record whether the order has been maintained or reversed for its corresponding ciphertext node, and wherein ciphertext values assigned to each plaintext value is stored in the database; receiving a query to be executed over the plaintext values from a client application; rewriting the received query to account for whether flipping has been assigned for nodes involved in the query, using information in the state of encryption generated during the encryption of the plaintext data; and transmitting the rewritten query to the remote, unsecured server to be executed.

In accordance with an exemplary embodiment, also disclosed herein is a method (and apparatus and computer product) for encrypting plaintext values, the method including randomly flipping an order of ciphertext values compared to their corresponding plaintext values, while also generating a state of encryption that indicates whether the order is maintained or flipped during the encryption, and storing the ciphertext values assigned to the plaintext values; storing the ciphertext values that correspond to the plaintext values; and storing the state of encryption as a record of when the order of the OPE scheme was broken.

BRIEF DESCRIPTION OF THE DRAWINGS

FIG. 1 shows an example of ciphers of an Order Preserving Encryption (OPE);

FIG. 4A through FIG. 4G shows exemplarily the tree insertion process of an exemplary embodiment;

DETAILED DESCRIPTION

Figure 2:
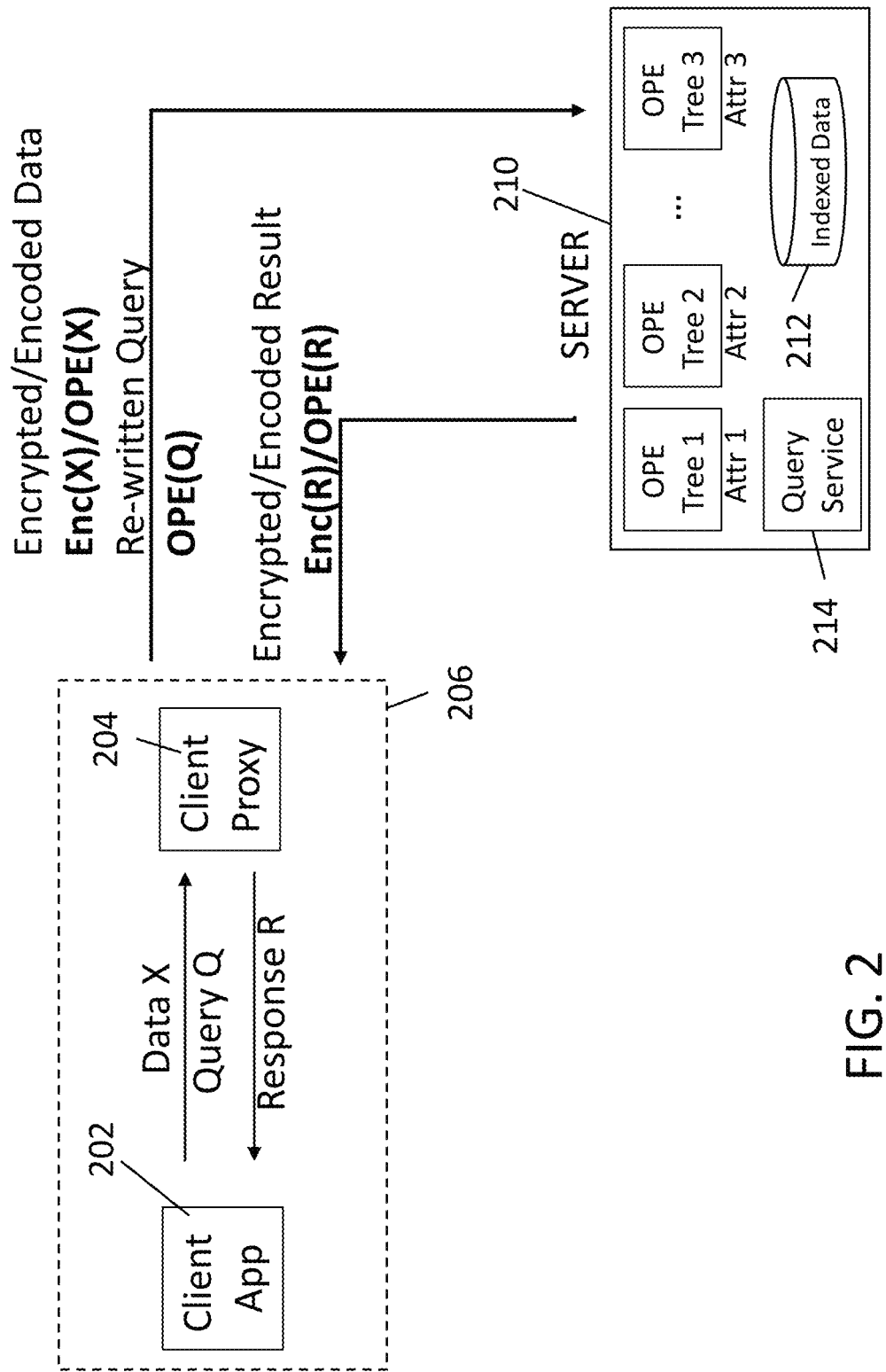
FIG. 2 shows an exemplary typical implementation of encryption using database as a service (DBaaS) and is relevant to both the present invention and conventional encryption methods.

There is an increasing trend towards moving data and computation to the cloud. Data are often sensitive and confidential, in both known and unknown ways. A third-party server is often untrusted and is therefore susceptible to snooping administrators and/or hackers that compromise server security. The problem being addressed by the present invention is that of being able to outsource storage and efficient computation on a possibly untrusted server without compromising the confidentiality of sensitive data.

Business workflows often involve outsourcing of storage and analysis of confidential data to untrusted third-party servers, such as in the cloud-based Database as a Service (DBaaS) model. In this cloud-based DBaaS model, the cloud service provider allows its clients to access a database which is hosted and managed by the cloud service provider. The maintenance and administration of database is responsibility of the cloud service provider. The clients can access the database in a variety of ways such as JDBC (Java Database Connectivity) API (Application Programming Interface), command line, etc. The client stores his data in the database and can later query the data for various purposes. The queries issued by the client include range queries, order queries, prefix searches, and so on.

To prevent data leakage at the disk level, various encryption schemes such as, for example, the Advanced Encryption Standard (AES), can be used to encrypt the data before writing it to disk and to decrypt the data when it is read from the disk. The keys for the encryption scheme can be chosen by the clients as well or these can be managed by the cloud service provider. However, this approach requires sharing encryption keys with a potentially untrustworthy server and hence it cannot provide data confidentiality from the server.

A naïve solution to the above problem of protecting confidential data on an untrusted server would be to encrypt the data using traditional encryption schemes such as AES before storing it in the database. The secret key would be maintained only at the client node. All the data that is stored in the database will be encrypted by the client before uploading to the cloud database. However, this approach would require downloading the encrypted dataset and decrypting it at the client node, for performing any computation on the stored data, which causes overhead that makes this solution infeasible for any practical setting.

Another solution to solve the above problem is to use a Fully Homomorphic Encryption Scheme to encrypt the data before storing it in the database. This will allow computations to be performed at the server, directly on the encrypted data, and only the encrypted result to be decrypted at the client node. However, as of now, the computations over Fully homomorphic cipher text are highly compute-intensive, requiring multiple orders of magnitude more time to process the query than it takes to process the same query on the plain text data, again making it infeasible for practical operations.

As an alternative, Property Preserving Encryption (PPE) schemes can be used to encrypt the data before storing it in the database. In a PPE scheme the cipher texts reveal certain properties of the plain text data. The revealed properties could be used to execute the queries directly on the cipher text without incurring a large overhead. A special class of PPE used to explain concepts of the present invention is Order Preserving Encryption (OPE) in which the cipher text preserves the order information of the plain texts. However, as will become clear after understanding concepts of the present invention, the present invention is not intended as limited to OPE alone.

Thus, looking specifically at OPE, if m1 and m2 are two plaintext messages such that m1<m2, then Enc (m1)<Enc (m2), where Enc ( ) refers to the encryption function in OPE, and the definition above means that the cipher text in OPE preserves the order information of the plaintexts. As is evident from this definition, OPE allows range and order queries to be performed directly over encrypted data with acceptable overhead. For example, if the range query is to find all those records where age>C then it can be transformed to find all those records where age>Enc(C).

FIG. 1 exemplarily shows ciphers Enc(msg) of an exemplary conventional OPE scheme, using four plaintext messages: 68, 71, 90, 98. As can be seen from the figure, the cipher texts preserve the order of the plain texts, for example, Enc(68)<Enc(71). This allows range and order queries to be performed directly over cipher texts. For example, from this sample, if one wants to find rows where score >90, it can be transformed to find all those rows where enc(score) >0x009b5708e13665a7de14d3d824ca9f15, as exemplarily shown by the callout 102 in FIG. 1. Thus, the client can run this range query by just storing the enc(score) in the database. This provides confidentiality to the client data since untrusted server never sees the score values in plain text.

OPE allows certain queries to be executed over the encrypted data because its cipher texts preserve the order of the corresponding plain texts. However, this same property of OPE can be exploited by a class of attacks, known as "inference attacks", to reveal information about the plain texts from their corresponding cipher texts. An attacker mounting the inference attack has access to a set of cipher texts encrypted using OPE (the encryption key is not known to the attacker) and a set of plain texts (called auxiliary information) which are related to the data encrypted using OPE. This auxiliary information may be available from various public data sources. Inference attacks use the auxiliary information in a variety of ways to leak information from the cipher texts. For example, an attacker may have access to OPE encrypted names of the customer of a company. He can, for example, use a publicly available dataset of names, such as census data, as his auxiliary information.

Over the past decade various inference attacks have been proposed which have varying degree of accuracy. Also, a number of OPE construction have been proposed which are resilient to these inference attacks by different degrees. These OPE constructions include frequency hiding OPE schemes, meaning schemes which hide the frequency of distinct plaint texts that have been encrypted. Other constructions include schemes that perform delayed ordering of cipher texts based on the incoming queries.

The OPE schemes can be classified based on the attributes such as:

a) Are they stateless or stateful?

b) Is the cipher text mutable?

c) Trade-off between computation and storage requirements.

In more detail, the OPE can be either stateless or stateful. In a stateless OPE, the cipher text assigned to a plain text is independent of the other encryptions which have been done up to that point in an encryption processing. The cipher text assignment only depends upon the encryption key. In a stateful OPE, the cipher text assignment to a plain text is dependent on the encryptions which have been done up to that point. The encryption function in stateful OPE takes three inputs: (a) plain text to be encrypted, (b) encryption key, and (c) current state. The encryption function outputs two values: (a) cipher text assigned to the plain text, and (b) updated state. The updated state is then used to encrypt the next value. FIG. 4A through FIG. 4G will show an exemplary stateful encryption processing using the new encryption scheme described in the present invention.

Another way to classify the OPE is based on whether the cipher text is mutable. In an OPE with immutable cipher text, the cipher text assigned to a plain text never changes. On the contrary in an OPE with mutable cipher text, the cipher text assigned to a plain text can change when new values are encrypted.

The following points are relevant to the following explanation of the invention:

The terms encryption/encoding are used interchangeably

The terms decryption/decoding are used interchangeably

All the communication that happens on the network is assumed to be secure via some protocol such as Secure Sockets Layer (SSL) or Transport Layer Security (TLS), etc.

The Client App and Client Proxy can be a single system. They could also be multiple systems arranged in any configuration, such as one to one or one to many. The only constraint is that if client proxy is present and is being used, then it sits between the client app and the remote server.

Only the Client App and Client Proxy have access to the secret key used for OPE encryption/decryption.

FIG. 2 shows exemplarily how conventional OPE is typically interfaced with a remote server 210 to store encrypted data on database 212. The client app 202 and trusted client proxy 204 are hosted in a secure environment 206. The attacker cannot compromise or hack them. When a client app 202 wants to insert a data X into the database 212 it submits a request to the client proxy 204. The client proxy 204 encrypts X using an OPE encryption scheme and then transmits OPE(X) to the remote server 210 for storage into database 212 and an appropriate response is sent back to the client app 202.

When a client app 202 wants to run a query Q on the database it submits a request to client proxy 204. The client proxy 204 transforms Q using appropriate transformation logic, such as all the constants used in the range predicate are replaced by their corresponding OPE encryptions. The transformed query is submitted to the remote server 210. The transformed query is exercised by server 210 using query service 214 and the result set is returned to the client proxy 204 as an encrypted result set. The client proxy 204 decrypts the result set and sends the decrypted result set back to client app 202 as the response.

Thus, the data is never decrypted at the remote server and hence it never sees the plain text data. The client app 202 does not need any change to its code to implement OPE since all the complexity is hidden by the client proxy 204.

An attacker can compromise or hack the remote server 210. This allows him to see the cipher text that the client proxy has stored in the database at the remote server. The attacker cannot decrypt the cipher text since he does not have access to the secret key, but he can mount an inference attack on the cipher text data. He can, for example, use some publicly available dataset as auxiliary information to mount an inference attack. For example, if the attacker knows that the client has stored names of his customers in the database, then he will use a publicly available dataset of names, such as, for example, census data, as his auxiliary information. How an attacker might know if a client has stored names of his customers, or anything else, is also considered as background information known to attacker.

The present invention presents a novel encryption scheme, referred to herein as "Flipped OPE" (FOPE), that supports range queries over the encrypted data. All other types of queries that can be reduced to range queries, such as, for example, Prefix match queries, are also supported over the encrypted data. However, the ordering queries cannot be supported directly over the encrypted data. FOPE provides better security guarantees compared to the prior encryption schemes which support range queries directly over encrypted data. In addition, FOPE protects the encrypted data against inference attacks as well. FOPE is a stateful encryption scheme, meaning that it maintains a state which is updated when a new value is encrypted. FOPE encryption scheme is also mutable, meaning that the cipher text assigned to a plain text can change as and when new values are encrypted. This FOPE encryption scheme incurs minimal storage and computational overheads to gain on security, which was the primary drawbacks in prior schemes, hindering their adoption.

The implicit assumption in most of the prior works on OPE is that the cipher text should totally maintain the order of the plain text in order to support range queries directly over encrypted data. But this characteristic also leads to most attacks on the prior OPE schemes. In fact, the present inventors consider that one can think of two extreme endpoints of the spectrum of possible solutions. One end point, is where the ciphertext assignment is completely random, meaning independent of the plain text. This extreme allows the strongest form of security, i.e., semantic security to be achieved. However, this approach would also incur the highest overhead in terms of handling range queries over encrypted data, specifically that the data has to be downloaded to client and decrypted to execute the range query. The other end of the spectrum, as what has been usually addressed by prior work, is where the cipher text fully preserves the ordering information of the plain text. This approach supports range queries over encrypted data very efficiently. Specifically, the end points of the range query have to be encrypted using the same encryption scheme and the transformed query can then be run over the encrypted data.

The method of the present invention FOPE (Flipped OPE), is a novel encryption scheme which breaks this implicit assumption of prior works that the order information between the plaintext data should be fully maintained by the corresponding OPE encodings in order to support range queries directly over the encrypted data. The ciphertexts generated by FOPE are only partially ordered. This means that, if ciphertext 1<ciphertext 2, then it does not mandatorily mean that plain text 1<plain text 2, where plain text 1 and plain text 2 are plain text used to generate cipher text 1 and cipher text 2, respectively. The cipher text ordering is violated at random points, which depends on the state and the encryption key, and is not known to the server. Hence the server cannot gain any information from cipher text about the ordering of the underlying plain text which were used to generate these cipher texts.

In order to support range queries directly over the encrypted data, the FOPE method maintains a state which broadly consists of: (i) mapping between the plain text and their cipher texts; and (II) the plain text values at which the ordering of plain texts and cipher texts has been broken.

The state that needs to be maintained can be stored at either client or server. If the state is stored at the client (client side proxy) then it can be stored in plaintext since the proxy is trusted. Storing state at the client requires additional storage to be available at the client side for storage. If the state is stored at the remote server, then it has to be encrypted before storing it at the remote server. The state should be encrypted using a semantically secure encryption scheme before storing it at a remote server. Storing state at the server utilizes the benefits of cloud by using additional space at the cloud for storage of the state. Whenever the client proxy needs to use the state, either for encrypting a value or for transforming a range query, it gets the encrypted state from the server, decrypts the state and uses it. The updated state is then encrypted and updated at the server. The client side proxy may read the state either fully (this will transfer lots of data each time to client) or only get the required parts (this will minimize the data transferred from remote server to proxy) or it can traverse the state in an organized manner (this will reduce the data to be transferred from remote server to the proxy).

In the following discussion, it is assumed that the state is stored at the remote server after encryption, using a semantically secure encryption scheme. It is also assumed that the client proxy traverses the state in an organized manner. However, these assumptions are not intended as limiting the present invention, since other combinations are clearly possible.

To implement the FOPE method, a probabilistic encryption scheme is introduced. The encryption scheme takes an encryption key as input. The encryption key includes: (i) secret key for encrypting the state before it is stored at the cloud; (ii) randomization seed to choose the cipher text which should be assigned to a plain text; and (iii) mean number of points at which the ordering of ciphertexts should be broken. The encryption key can have more components but, for this explanation, this nonlimiting listing is sufficient.

The state is stored at the remote server after encryption. In an exemplary embodiment to explain concepts of the invention, the scheme stores the state in the form of a Binary Search Tree (BST). However, other storage structures can be used such as, for example, b-trees, etc.

Each node of the BST stores the following information:

(i) Plain text value
(ii) Cipher text range
(iii) Flipped (flag to indicate if the order has been broken between the children of this node)
(iv) Left child identification (id)
(v) Right child identification (id).

The node can have more information but the following discussion uses this nonlimiting list. When a new BST node is created, the client proxy assigns a unique id to it. The unique id is used to get the node from the server. By maintaining the unique id of the root node of BST at the client proxy, whole tree can be traversed by using the child ids stored in the node.

The data of each node is encrypted by the client proxy before sending it to the cloud. Hence, from a server point of view, only the unique ids and the encrypted node data are seen. Thus, the server cannot gain any information about the state from the BST which has been stored by the client. In fact, the server will also not be able to construct the tree of encrypted nodes. This is because the tree structure (i.e., the ids of the children) is also encrypted along with the node data and, hence, the server also does not have access to it.

In a typical BST, all the values in the left subtree are smaller than the root value and all the values in the right subtree are greater than the root value. This property of BST can be used to make an OPE encoding scheme. The BST is created from the values that have been encrypted till now. A ciphertext is assigned to the plaintext values in the tree. The ciphertext assigned to the left child is smaller than the cipher text assigned to the parent node and the cipher text assigned to the right child is greater than the cipher text assigned to the parent node.

Figure 3A:
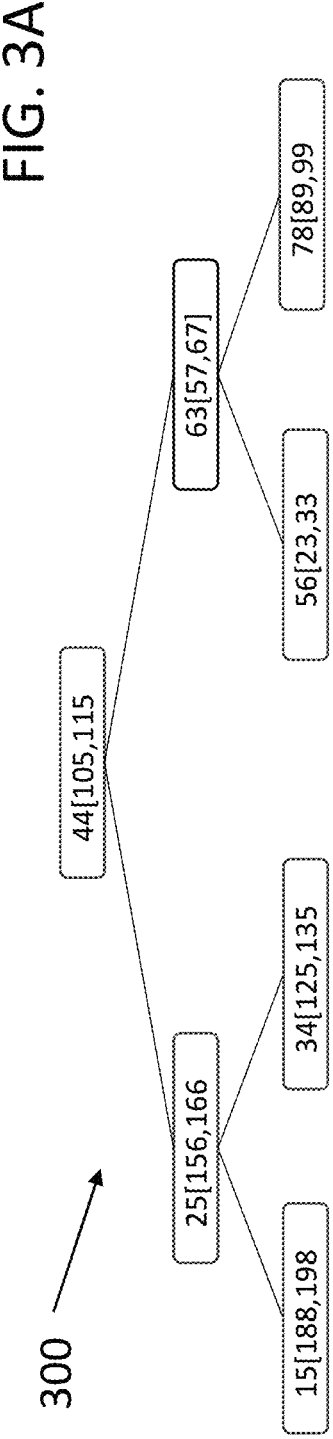
FIG. 3A exemplarily shows conventional OPE data structure.

An example of the conventional OPE BST is shown in FIG. 3A. Note that each node shown in FIG. 3A is presented such that the intended plaintext value is shown as the left-most number followed by a pair of numbers in brackets that together defines a range in which the plaintext value will be stored in its OPE encrypted form in memory. Thus, for example, taking the BST root node in the BST of FIG. 3A, the value "44[105,115]" means that value 44 is the message to be encrypted under OPE to become a ciphertext value stored in memory somewhere in the range of 105 to 115, the precise value being randomly assigned in accordance with parameters defined in the OPE encryption system that has been implemented.

In contrast, the FOPE uses a modified BST in which the nodes have the following properties:
If the flipped flag of node is not set
    The plain text values in the left subtree are smaller than the plaintext value of the node
    The plain text values in the right subtree are greater than the plaintext values of the node.
If the flipped flag of the node is set
    The plain text value in the left subtree are greater than the plaintext value of the node.
    The plain text values in the right subtree are smaller than the plaintext values of the node.

The modified BST is created from the values that have been encrypted to the current point of encryption of a specific data structure used to store the ciphertext. A ciphertext is assigned to the plaintext values in the tree. The ciphertext assigned to the left child is smaller than the cipher text assigned to the parent node and the cipher text assigned to the right child is greater than the cipher text assigned to the parent node.

From the above description, it should be emphasized that the random flipping of the present invention does not alter the conventional OPE data order of ciphertext data stored in the remote server. Rather, the random flipping means that, if ciphertext value 1<ciphertext value 2, then it is not assured that plaintext value 1<plaintext value 2, where plaintext value 1 and plaintext value 2 are plaintext values used to respectively generate ciphertext value 1 and ciphertext value 2. The record of flipping events lets the proxy recognize when the plaintext value order has been flipped relative to the ciphertext value order. The order of ciphertext data is completely independent of any flipping events, so that ciphertext data would appear at least as conventional OPE ciphertext data. Because the ciphertext data values themselves provide no suggestion of whether a random flipping mechanism has been implemented, a potential hacker cannot even be aware of whether FOPE is used for encryption, thereby providing additional security.

Figure 3B:
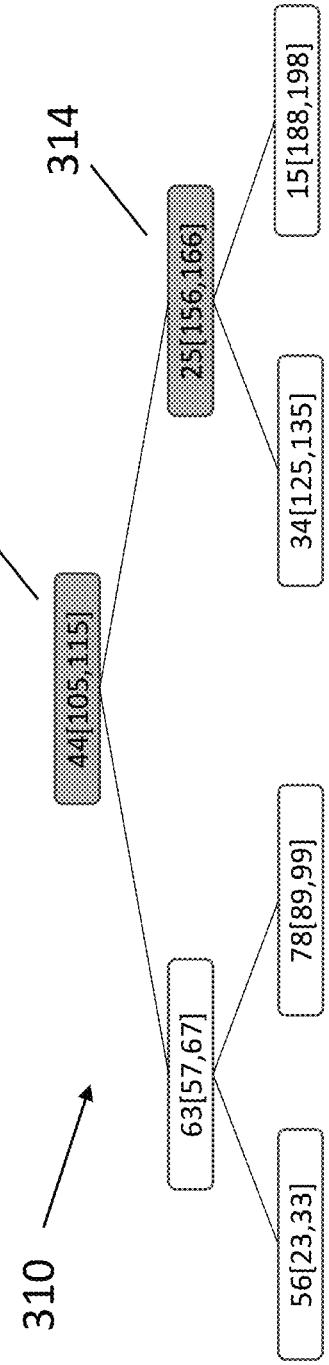
FIG. 3B exemplarily shows how the present invention randomly flips the normal ordering in a Property Preserving Encryption (PPE) scheme such as OPE.

An example of FOPE is shown in the BST in FIG. 3B. The flipped flag is set in the nodes corresponding to the plaintext values of 44 and 25. For these two nodes, the plaintext values in the left subtree are greater than the plain text value of the node, and plain text values in the right subtree are smaller than the plain text value of the node. The cipher text assignment is also shown as the pair of numbers in the bracket.

The modified BST of FOPE for a set of values can be constructed in a variety of manners. Two non-limiting exemplary cases will now be described: (a) batched encryption (b) incremental encryption.

1. Batched Encryption

The batched encryption works when all the values to be encrypted are known before encryption begins. This mode has a nice property that cipher text are not changed once assigned.

The batched encryption works in two steps. In the first step, a modified BST is created from all the values that have to be encrypted. In this step the cipher text is not assigned to the plain text values. This step does set the flipped flag of the nodes. In the second step, cipher text is assigned to each node in the modified BST. The modified BST is then stored at the remote server (after encryption). The id of the root node is maintained by the client proxy. Later, when the client proxy has to encrypt a value (p), it proceeds in the following manner:
1. Get the encrypted root node from the remote server, by using the id of the root node.
2. Decrypt to get the node in plaintext at the client proxy.
3. If p is equal to the plain text of node then return a value from the cipher text range as the cipher text.
4. If p is less than the plain text of node
    If node is not flipped then get the left child of the node and go to step 2
    If node is flipped then get the right child of the node and go to step 2
5. If p is greater than the plain text of node
    If node is not flipped then get the right child of the node and go to step 2
    If node is flipped then get the left child of the node and go to step 2.

2. Incremental Encryption

Incremental encryption is used when all the values to be encrypted are not known beforehand. In this mode the modified BST is built incrementally and cipher text are assigned to plain text when they are encrypted. The cipher text assigned to plaintext can change in this mode. To encrypt a plain text value (p) client proxy works in the following steps:

1. Check if p is present in the modified BST. This is done by doing a binary search (based on flipped flag of the nodes).
2. If p is present in the modified BST, then a value from the cipher text range assigned to it is returned.
3. If p is not present in the modified BST, then a new node is created for p at the proper place. The flipped flag is chosen for this new node based on the parameter set in the encryption key. The cipher text range is assigned to the node based on the other cipher texts in the tree.
4. The new node is stored in the state maintained at the remote server.
5. A value from the cipher text range assigned to p is returned.

In step 3, it can happen that there is no cipher text range available for the new node corresponding to plain text p. In this case the cipher texts assigned to the other nodes is changed appropriately such that a cipher text range becomes available for the new node corresponding to the plain text p. This causes mutations of the cipher text for those nodes whose cipher text is adjusted to make room for the cipher text of the new node.

Note that this is an iterative method in which the client proxy is interacting with remote server at each step.

Example of FOPE Encryption

An example to illustrate the exemplary scheme is now presented in FIG. 4A through 4G. Suppose the client proxy (configured to run in incremental mode) gets the following values to encrypt: 44, 63, 25, 56, 78, 34, 15, 44, 25, 56, 78.

Although this listing includes redundancy, this redundancy is intended to showcase that:

1) When a value being encrypted is already present in the tree, no change happens to the tree structure; and
2) The cipher text assigned to a plain text is randomly chosen from the cipher text range that has been assigned to its node. This gives the encryption scheme a "frequency hiding" characteristic.

For the values listed above, the client proxy chooses an encryption key E and sets root node to null. Initially the state stored at the server is empty. For the first value, i.e., 44, Client proxy will create a node N1 (plain text value=44, cipher text range=[105-115], flipped=true, left child id=null, right child id=null). Then the client proxy will encrypt N1, using the encryption key to get N1'. Then it will assign a randomly generated unique id Id1 to N1 and store [Id1, N1'] at the server. The cipher text for 44 is a value randomly chosen between 105 and 115. The client proxy will update its state to store Id1 as the root of the tree, so this exemplary embodiment demonstrates stateful FOPE. The tree stored at the server will look like Tree 1 in FIG. 4A.

For the next value, i.e. 63, Client proxy will first get the value corresponding to the root node id (Id1) from the server. It will get N1' in this case. Then it will decrypt N1' to get N1. Client proxy will then compare 63 and N1. plain text value, i.e. 44. Here 63 is greater than 44 but the flipped flag of N1 is set to true. This means that the node containing 63 has to be in the left subtree of N1. However, N1 has no left child, so client proxy will create a new Node N2 (plain text value=63, cipher text range=[57-67], flipped=false, left child id=null, right child id=null). Then the client proxy will encrypt the N2 node using the encryption key to get N2'. Then it will assign a randomly generated unique id Id2 to N2 and store [Id2, N2'] at the server. The left child of N1 will be updated to Id2, the updated N1 will be encrypted and stored at the server (with the same id). The cipher text of 63 is a value randomly chosen between 57 and 67. The state at the client will remain unchanged. The tree stored at the server will look like Tree 2 in FIG. 4B.

Figure 4E:
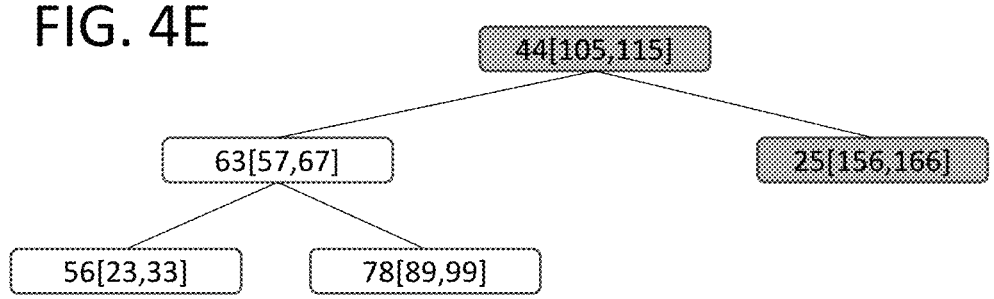
Figure 4F:
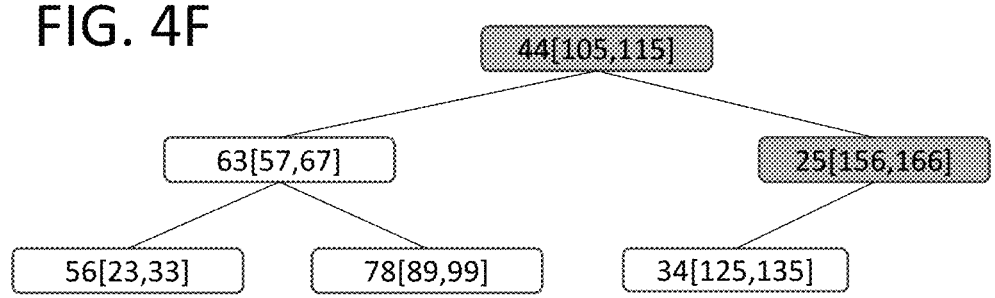
Figure 4G:
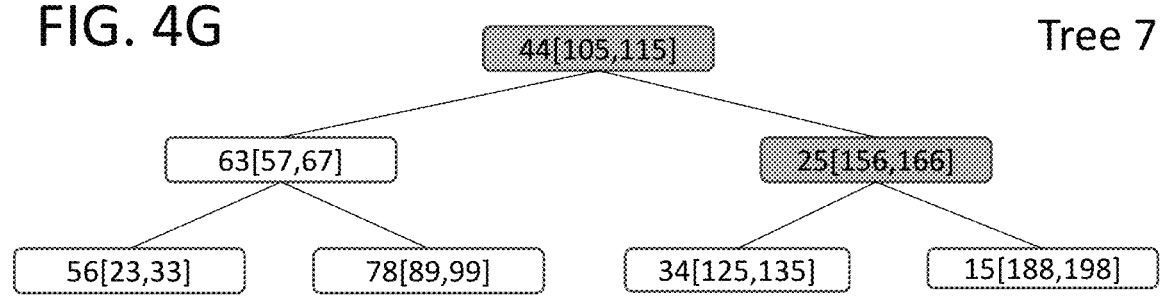

The state of the tree when further values are encrypted is shown in Tree 3 (FIG. 4C) to Tree 7 (FIG. 4G). The nodes which are flipped have been marked in grey. The cipher text range assigned to each node is also shown in the figure.

When the last four values in the list i.e. 44, 25, 56, 78 are encrypted, the nodes corresponding to them are already found in the tree. Hence the state of the encryption scheme remains the same. Additionally, the cipher text assigned to these values is randomly chosen from the cipher text range that has been assigned to their respective nodes in the tree. This random choosing of cipher text also makes FOPE "frequency hiding".

One potential assignment of cipher text to plain text is [44-112, 63-57, 25-157, 56-23, 78-89, 34-134, 15-196, 44-114, 25-165, 56-25, 78-90]. The cipher texts do not leak either the individual frequency or the cumulative frequency of the data points. The decision to flip each node is taken independently for each node. For same sequence of values different flip decisions will lead to different tree structure and hence different ordering of cipher texts. If the same set of values come in different sequence, the tree structure will change leading to different ordering of cipher texts. Unless the adversary knows the order of values being inserted and the flipping decision taken at each node, he will not be able to guess the correct order of cipher text.

The server never sees the plain text content of the nodes. His view of the nodes in the tree is mapping between ids and encrypted nodes. This ensures that server does know the structure of the tree. As a result, server does not know whether a particular node is flipped or not.

Even though the cipher texts assigned to various plain texts do not follow strict order, it is possible to efficiently answer the range queries. In the current example, if the user wants to issue the following range query [40, 60], then it will be transformed to the [20, 30] or [50, 110].

Range Queries

Figure 5:
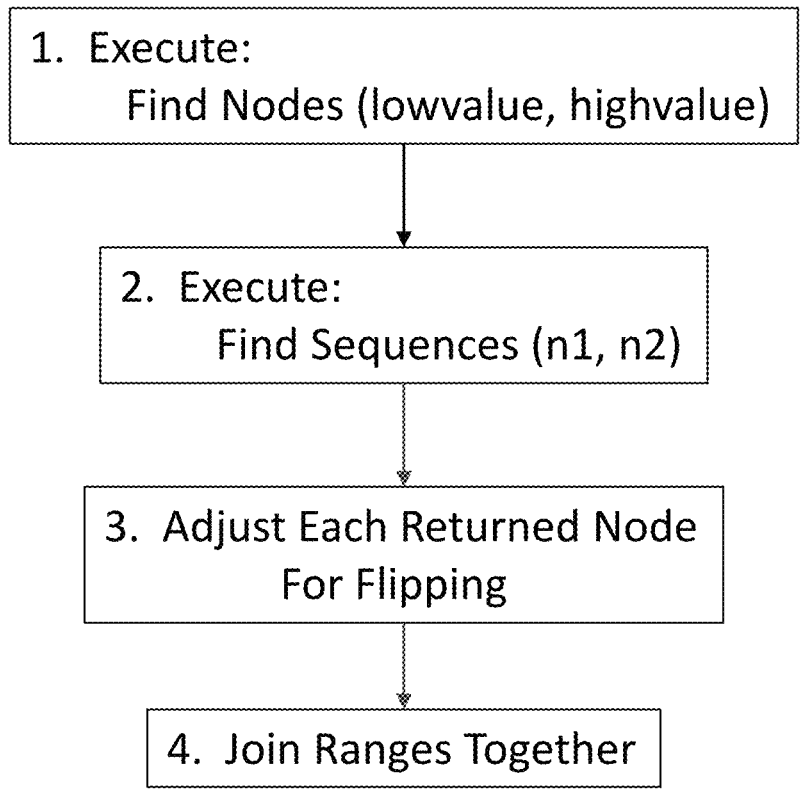
FIG. 5 shows steps to be executed by the client proxy to transform a range query for the modified BST that has been stored at a remote server using the modified OPE of the present invention.

To support range queries over the encrypted data, the client proxy has to transform the range query based on the modified BST that has been stored at the remote server. Suppose the range to be transformed is [lv, hv]. The client proxy does the following four steps, as shown in FIG. 5, keeping in mind that in the exemplary embodiment the client proxy stores the node ids for each BST and the state is stored in the remote server:

1. Use FindNodes(lv,hv) to find the two nodes to be processed. Let the two nodes be n1 and n2.
2. Use FindSequence(n1,n2) to find the sequence of nodes to be processed. Let the sequence be S.
3. For each node (cn) in the sequence S:
   a. Call ProcessNodeUp(cn) if flag is up,
   b. Call ProcessNodeDown(cn) if flag is down.
4. Each call to 3a and 3b will output some ranges. The continuous ranges are joined together. At the end client proxy will have the transformed range which will be in the form as [lv1,hv1] or [lv2, hv2] . . . or [lvn, hvn].

This transformation above permits the client app 202 of FIG. 2 (as modified to further incorporate FOPE features in addition to conventional OPE) to submit a query over the plaintext and leaves it up to the client proxy 204 to transform the query into the appropriate query over the ciphertext so that the query service 214 of the remote server 210 can perform a simple database query service 214 on the encrypted data.

Once the client proxy gets the transformed range, then it can be used to process the range query directly over the encrypted data. For example, if the client data is stored in a database then the range predicate is replaced by a conjunction of range predicates where each conjunct is a single continuous range from the transformed range. The transformed query is then executed fully over the encrypted data stored at the server.

Details of the interactive function used above by the client proxy will now be given below. These details demonstrate the steps which the client proxy has to carry out for transforming the plain text query Q to an equivalent query Q' over encrypted data. The methods ensure that the result set which is generated by executing Q' over encrypted data is same as result set which would have been generated by executing Q over plain text data, thereby making sure that the transformed query Q' produces correct and complete result.

Find Nodes (lowvalue, highvalue)
For lowvalue
  Find node with plain text=lowvalue in the tree
  if such node exists in the tree
    Return the node
  else if such node does not exist in the tree
    Find where the node with plain text=lowvalue will be inserted in the tree. Let's call it potentialParent.
    If potentialParent.plain text value∈[lowvalue, highvalue]
      Return the potentialParent
    if potentialParent.plain text value∉[lowvalue, highvalue]
      Return the next node in the sorted traversal of modified BST
For highvalue
  Find node with plain text value=highvalue in the tree
  if such node exists in the tree
    Return the node
  else if such node does not exist in the tree
    Find where the node with plain text value=highValue will be inserted in the tree. Let's call it potentialParent.
    If potentialParent.plain text value∈[lowvalue, highvalue]
      Return the potentialParent
    else if potentialParent.plain text value∉[lowvalue, highvalue]
      Return the previous node in the sorted traversal of modified BST FindSequence (lowvalue, highvalue)
Find nodes in path from node with plain text value=lowvalue to root node. Let's call it P1.
Find nodes in path from root to node with plain text value=highvalue. Let's call it P2.
For (nodes∈P1)
  if node∈P2
    Add it to processing as LCA (Least Common Ancestor). It will have flag up.
    break out of loop
  else if node∉P2
    Add it to processing with flag up.
    Also add the information if the previous node was Left Child or Right Child.
For (nodes∈P2 after LCA)
  Add it for processing with flag down.
  Also add the information is the next node is Left Child or Right Child.

ProcessNodeUp (Node)
If the node is leaf node then add its cipher text range to output range
Else if the node is LCA (Least Common Ancestor) then
  add its cipher text range to output range
Else if the node is coming up from Left Child
  if node is not flipped
    Add cipher text range of the node to the output range
    Add cipher text range of the Right subtree range to output range.
  else if the node is flipped then do nothing
Else if the node is coming up from Right Child
  if node is not flipped then do nothing
  else if the node is flipped
    Add cipher text range of node to the output range
    Add cipher text range of the Left subtree range to output range.

ProcessNodeDown (Node)
If the node is leaf node then add its cipher text range to the output range
Else if the next node is Right Child
  if node is not flipped
    Add cipher text range of node to the output range
    Add cipher text range of the Left subtree range to output range.
  else if node is flipped then do nothing
Else if the next node is Left Child
  If the node is not flipped then do nothing
  else if the node is flipped
    Add cipher text range of node to the output range
    Add cipher text range of Right subtree range to output range.

The Flipping Mechanism

In an exemplary preferred embodiment, the encryption key of FOPE contains the following parameter, mean number of points at which the ordering of ciphertexts should be broken. It can be defined as a probability value. When defined as a probability value it can be implemented as follows: whenever a new node is created in the modified BST, its flipped flag is set with a probability equal to this parameter. Thus, in an exemplary embodiment, a random process is then executed using this parameter to define the process, so that each node's likelihood of being flipped is randomly implemented by setting this parameter, which, in turn, makes a setting on a random process, which, in turn determines whether a specific node is flipped.

One exemplary way to implement this is as follows: Whenever a new node is created, a random real number between 0 and 1 is generated. If the generated number is less than the defined probability value, set the flipped flag of the node.

By varying the value of this parameter between 0 to 1, one can choose to operate at various different points of the solution spectrum. Thus, when value of this parameter is 0, the cipher text strictly follows the order of plaintext, i.e., if $m1<m2$, then $c1<c2$, where c1 and c2 are encryptions of m1 and m2, respectively. When the value of this parameter is 1, the cipher text strictly follows the reverse order of plaintext, i.e., if $m1<m2$, then $c1>c2$, where c1 and c2 are encryptions of m1 and m2, respectively. The in-between values let one choose different points in the solution spectrum. The number of nodes to be flipped in the modified BST can be decided in a variety of manners. The discussion above explains just one example of how the decision can be taken. Other probabilistic mechanisms could also be used.

Multiple Layers of Security Against Attack

The cipher texts assigned to plain texts depend on the following factors: (a) the sequence of values that are encrypted; and (b) the nodes whose flipped flag has been set to true. The attacker does not have access to either of these pieces of information. In the absence of these information the attacker is not able to find the correct order of the cipher text (corresponding to the plain text). Also, for each plain text value the cipher text which is received for each occurrence in the data value is a random value from its cipher text range. These factors ensure that the individual frequency and cumulative frequency which the attacker gets are not correct. This reduces the accuracy of inference attacks to a great degree, since they depend on availability of the individual and cumulative frequency.

The BST Structure

The number of conjuncts in the transformed range query of FOPE depends directly on depth of the tree. The modified BST which we have used in the explanation does not have any guarantee on the depth of the tree. If the number of disjuncts needs to be bounded, then a balanced tree structure like AVL tree can be used instead of the modified BST, where the AVL tree is well known in computer science as a self-balancing BST. The AVL tree will also have similar modification as we had for modified BST, i.e., adding of a flipped flag to each node. In addition, the balanced tree structure does operations to balance the tree structure when the tree starts to become unbalanced. This can lead to mutations of cipher text when such operations are done. This provides a trade-off (i.e., between the number of mutations and the number of conjuncts) which the user can choose.

System Implementation

The present invention can be implemented in a number of various computer implementations, including a DBaaS cloud service being offered which for data storage of encrypted data. Therefore, although this disclosure includes a detailed description on cloud computing, as follows, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
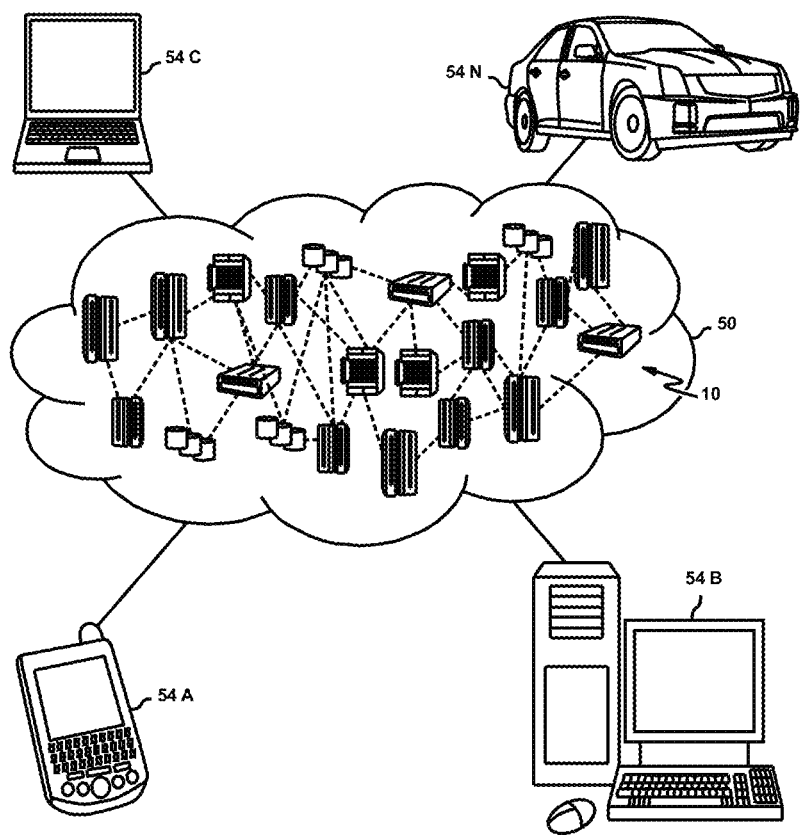
FIG. 6 shows a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
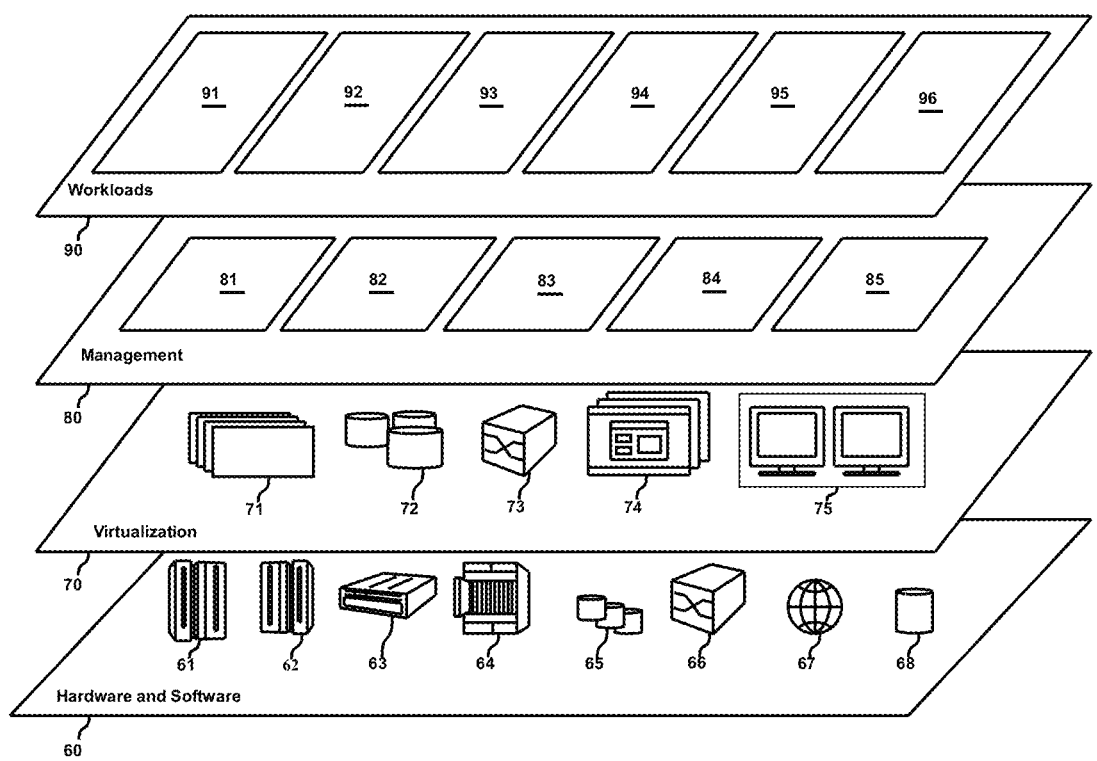
FIG. 7 depicts abstraction model layers according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include tasks related to the implementation of the present invention in which POPE/FOPE is incorporated, for example, into a DBaaS-based cloud service.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification. Thus, as previously mentioned, the concepts of the present invention could be incorporated in any Property Preserving Encryption (PPE) scheme and is not limited to Order Preserving Encryption (OPE) used to explain the invention.

Further, it is noted that, Applicants' intent is to encompass equivalents of all claim elements, even if amended later during prosecution.

What is claimed is:

1. A method to encrypt data, the method comprising:
   encrypting plaintext data into ciphertext data by executing a Property Preserving Encryption (PPE) scheme on a processor on a computer as an encryption process, the PPE scheme preserving a predefined property between plaintext values and their associated ciphertext values, wherein the encryption process randomly flips the predefined property and generates a state of encryption that comprises a record of whether the predefined property is maintained or flipped during an encryption;
   storing the ciphertext data; and
   storing the state of encryption as a record of when the predefined property has been randomly broken.

2. The method of claim 1, wherein the encryption of the plaintext data is executed in a trusted client proxy that is hosted in a secure environment with a client application, and wherein the corresponding ciphertext data is stored remotely in a database hosted on an untrusted third-party server.

3. The method of claim 2, wherein the untrusted third-party server operates as a cloud-based Database as a Service (DBaaS) model.

4. The method of claim 2, wherein the PPE protocol comprises an Order Preserving Encryption (OPE) protocol in which the predefined property maintained in the PPE protocol is order, such that, if m1 and m2 are two plaintext values with m1<m2, then an order of the corresponding two ciphertext values, Enc(m1) and Enc(m2), is maintained as Enc (m1)<Enc (m2), and
   wherein the encryption process randomly flips order values between plaintext values and ciphertext values,
   whereby the order being randomly flipped means that, if ciphertext value 1<ciphertext value 2, then it is not assured that plaintext value 1<plaintext value 2 without information from the state of encryption as recorded during the encryption process, where plaintext value 1 and plaintext value 2 are plaintext values used to respectively generate ciphertext value 1 and ciphertext value 2.

5. The method of claim 4, wherein the state of the encryption comprises a Binary Search Tree (BST) structure having a property that a plaintext value of a left child node is smaller than a plaintext value of a parent node and a plaintext value of a right child node is greater than the plaintext value of the parent node,
   wherein the encryption process randomly flips the order so that the plaintext value of the left child is greater than the plaintext value of the parent node and the plaintext value of the right child is less than the plaintext value of the parent node, wherein cipher text values assigned to plaintext nodes of the flipped plaintext BST structure have a property that the cipher text assigned to the left child is smaller than a cipher text assigned to the parent node and the cipher text value assigned to the right child is greater than the cipher text value assigned to the parent node, and wherein the state of encryption further comprises an indication of whether flipping has occurred, thereby indicating a break in the predefined property of order for ciphertext values.

6. The method of claim 5, wherein the indication in the state of encryption of whether flipping has occurred is stored in the trusted client proxy, as associated with each BST structure.

7. The method of claim 5, wherein the indication in the state of encryption of whether flipping has occurred is stored in the database, as associated with each BST structure, and wherein the state of encryption is encrypted before storing in the database.

8. The method of claim 2, further comprising:
receiving a query over the plain text data in the client proxy from the client application;
rewriting the query in the client proxy to account for whether flipping has been assigned to nodes involved in executing the query, in accordance with a record of flipping included in the state of encryption; and
transmitting the rewritten query to the untrusted server for execution.

9. The method of claim 8, further comprising:
receiving a response in the client proxy for the rewritten query from the untrusted server;
decrypting the response using the flipping information from the state of encryption used during the encrypting; and
transmitting the decrypted response to the client application that provided the query.

10. A method of computing range queries over encrypted data, the method comprising:
initially encrypting plaintext data by executing an Order Preserving Encryption (OPE) protocol as an encryption on a processor on a computer and storing ciphertext data in a database via a remote, unsecured server, the OPE protocol maintaining an order of values when plaintext values are encrypted into ciphertext values, wherein during the encrypting, for each node of plaintext being encrypted, the order is randomly flipped, and, for each encrypted plaintext node, a state of encryption is generated and stored so as to record whether the order has been maintained or reversed for its corresponding ciphertext node, and wherein ciphertext values assigned to each plaintext value is stored in the database;
receiving a query to be executed over the plaintext values from a client application;
rewriting the received query to account for whether flipping has been assigned for nodes involved in the query, using information in the state of encryption generated during the encryption of the plaintext data; and
transmitting the rewritten query to the remote, unsecured server to be executed.

11. The method of claim 10, further comprising:
receiving a response for the rewritten query from the remote, untrusted server;
decrypting the response using the state of encryption generated during the initial encrypting; and
transmitting the decrypted response to a trusted client application providing the query.

12. The method of claim 10, wherein the encryption of the plaintext value is executed in a trusted client proxy that is hosted with a client application in a secure environment and the corresponding encrypted ciphertext value is stored remotely in a database of an untrusted third-party server.

13. The method of claim 10, wherein the client application, the client proxy, and the third-party server operate in a cloud-based DataBase as a Service (DBaaS) model.

14. A method of encrypting plaintext values, using a Flipped Order Preserving Encryption (FOPE) encryption scheme, the method comprising:
randomly flipping an order of ciphertext values relative to their corresponding plaintext values, while also generating a state of encryption that indicates whether the order is maintained or flipped during the encryption, and storing the ciphertext values assigned to the plaintext values;
storing the ciphertext values that correspond to the plaintext values; and
storing the state of encryption as a record of when the order of the OPE scheme was broken.

15. The method of claim 14, wherein the plaintext to be encrypted originates in a client application in a secure environment with a client proxy that performs the encryption of data received from the client application, and wherein the client proxy transmits encrypted plaintext data as ciphertext data to a remote server for storage.

16. The method of claim 15, wherein, when the client application provides a query to the client proxy for searching data stored at the remote server, the client proxy transforms the query to account for the flipping events and encrypts and transmits the transformed query to the remote server for query service, and wherein, when the client proxy receives a result of the transformed query back from the remote server, the client proxy decrypts the result, transforms the decrypted result in reverse to account for the flipping events, and then transmits the reverse transformed result to the client application.

17. The method of claim 14, wherein an encryption key used for the FOPE encryption scheme comprises:
a secret key used for encrypting a state of a data structure storing ciphertext before being transmitted to the remote server;
a randomization seed to choose a ciphertext value to be assigned to a plaintext value; and
a mean number of points at which an ordering of ciphertext values should be broken.

18. The method of claim 14, wherein the client proxy and remote server function in a cloud-based Database-as-a-Service (DBaaS) model.

19. The method of claim 14, wherein the state is stored in a Binary Search Tree (BST) and each node of the BST includes: a plain text value; a cipher text range; a flipped flag; a left child identification; and a right child identification, and wherein:
if the flipped flag is not set, then plaintext values in a left subtree are smaller than plaintext values of the node and plaintext values in a right subtree are larger than plaintext values of the node, and
if the flipped flag is set, then plaintext values in a left subtree are larger than plaintext values of the node and plaintext values in a right subtree are smaller than plaintext values of the node.

20. The method of claim 19, wherein, when a new BST node is created, the client proxy assigns a unique identification for the node and the unique identification is used to get the node from the remote server, and wherein, by maintaining an identification of a root node of each BST at the client proxy, a whole BST tree can be traversed by using the child identification.

* * * * *